(12) United States Patent
Muramatsu

(10) Patent No.: US 9,461,317 B2
(45) Date of Patent: Oct. 4, 2016

(54) FUEL CELL SYSTEM AND CONTROL METHOD THEREFOR

(75) Inventor: Yasuyuki Muramatsu, Shizuoka (JP)

(73) Assignee: Yamaha Hatsudoki Kabushiki Kaisha, Shizuoka (JO)

( * ) Notice: Subject to any disclaimer, the term of this patent is extended or adjusted under 35 U.S.C. 154(b) by 1913 days.

(21) Appl. No.: 11/831,182

(22) Filed: Jul. 31, 2007

(65) Prior Publication Data

US 2008/0026273 A1    Jan. 31, 2008

(30) Foreign Application Priority Data

Jul. 31, 2006  (JP) ................. 2006-208953

(51) Int. Cl.
*H01M 8/04* (2016.01)
*H01M 16/00* (2006.01)
*H01M 8/10* (2016.01)

(52) U.S. Cl.
CPC ....... *H01M 8/04194* (2013.01); *H01M 8/0432* (2013.01); *H01M 8/04201* (2013.01); *H01M 8/04268* (2013.01); *H01M 8/04328* (2013.01); *H01M 8/04365* (2013.01); *H01M 8/04626* (2013.01); *H01M 8/04753* (2013.01); *H01M 8/04955* (2013.01); *H01M 16/006* (2013.01); *H01M 8/04134* (2013.01); *H01M 8/04559* (2013.01); *H01M 8/04589* (2013.01); *H01M 8/04701* (2013.01); *H01M 8/04708* (2013.01); *H01M 8/04776* (2013.01);
(Continued)

(58) Field of Classification Search
CPC ................... H01M 8/04194; H01M 8/04201; H01M 8/04268; H01M 8/0432; H01M 8/04328; H01M 8/4365; H01M 8/04753; H01M 8/04626; H01M 8/04955; H01M 16/006

USPC ....... 429/415, 433, 447, 456, 457, 434, 436, 429/442
See application file for complete search history.

(56) References Cited

U.S. PATENT DOCUMENTS

| 6,821,658 | B2 | 11/2004 | Acker et al. | |
| 2002/0106542 | A1* | 8/2002 | Matejcek et al. | ............... 429/22 |

(Continued)

FOREIGN PATENT DOCUMENTS

| EP | 1 821 358 A1 | 8/2007 |
| JP | 2004-055474 A | 2/2004 |

(Continued)

OTHER PUBLICATIONS

Official communication issued in counterpart European Application No. 07014947.1, mailed on Mar. 11, 2009.

*Primary Examiner* — Eugenia Wang
(74) *Attorney, Agent, or Firm* — Keating & Bennett, LLP

(57) ABSTRACT

A fuel cell system and a control method enables a smooth shift from a heat-up operation to a normal operation in a simple operating process. The fuel cell system includes a cell stack, an aqueous solution holding device having aqueous solution tanks which store aqueous methanol solution, and a first connecting portion and a second connecting portion which connect the aqueous solution tanks with each other, and a temperature sensor which detects a temperature of the aqueous methanol solution. Based on a result of a temperature detection, a setting is made for one of a first mode where the aqueous methanol solution in the aqueous solution tank is circulated to the cell stack and a second mode where the aqueous methanol solution in the aqueous solution tanks is circulated to the cell stack.

11 Claims, 10 Drawing Sheets

(52) U.S. Cl.
CPC ...... *H01M 8/1011* (2013.01); *H01M 2250/20* (2013.01); *Y02E 60/50* (2013.01); *Y02T 90/32* (2013.01)

(56) References Cited

U.S. PATENT DOCUMENTS

| | | | |
|---|---|---|---|
| 2004/0166389 A1 | 8/2004 | Matsuoka et al. | |
| 2005/0208352 A1* | 9/2005 | Sato et al. | 429/24 |
| 2005/0214601 A1 | 9/2005 | Shimizu et al. | |
| 2005/0282049 A1* | 12/2005 | Sasaoka et al. | 429/13 |
| 2006/0222915 A1 | 10/2006 | Sumino et al. | |
| 2007/0212581 A1 | 9/2007 | Kanai et al. | |
| 2009/0214903 A1* | 8/2009 | Muramatsu et al. | 429/17 |

FOREIGN PATENT DOCUMENTS

| | | |
|---|---|---|
| JP | 2004-178818 A | 6/2004 |
| JP | 2004-530259 A | 9/2004 |
| JP | 2005-276657 A | 10/2005 |
| JP | 2006-004868 A | 1/2006 |
| JP | 2006-286239 A | 10/2006 |
| WO | 2005/124914 A1 | 12/2005 |
| WO | 2006/025321 A1 | 3/2006 |

* cited by examiner

F I G. 7
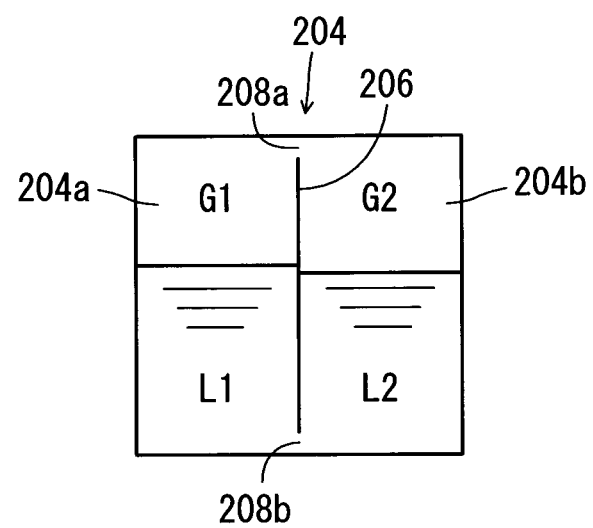

FIG. 9

FUEL CELL SYSTEM AND CONTROL METHOD THEREFOR

BACKGROUND OF THE INVENTION

1. Field of the Invention

The present invention relates to fuel cell systems and control methods therefor, and more specifically, to a fuel cell system in which aqueous fuel solution is supplied directly to fuel cells, and also relates to a control method therefor.

2. Description of the Related Art

In the field of direct methanol fuel cell systems, there has been a requirement to shorten a time from operation start to a time when the system begins operating at its full capacity. As a solution, proposals have been made with a goal of shortening a heat-up time required to heat aqueous methanol solution supplied to the fuel cell to a predetermined temperature.

For example, WO2006/025321 discloses a technique that an amount of aqueous fuel solution stored in the aqueous solution tank is moved to another tank when the system is started, in order to shorten the time required to attain a predetermined temperature.

Also, JP-A2006-004868 discloses a technique of providing a first container for storing low-concentration fuel which is mainly for power generation and a second container for storing high-concentration fuel which is mainly for power generation and increasing the temperature of the power generation cell so that one of the containers is selected thereby switching the types of fuel to be supplied to the power generation cell based on the temperature of the power generation cell.

According to WO2006/025321, it is possible to shorten the heat-up time by moving aqueous fuel solution from the aqueous solution tank to another tank thereby decreasing the amount of aqueous fuel solution which is in circulation during the heat-up operation. However, in order to begin normal operation, the aqueous fuel solution which was moved to the other tank must be returned to the aqueous solution tank, and this complicates an operation process.

Also, according to JP-A 2006-004868, it is possible to raise the temperature of the power generation cell in a short time. However, switching to the other container in order to shift to normal operation causes a sudden change in the temperature and concentration of the aqueous fuel solution which is being supplied to the power generation cell, making it impossible to perform a smooth shift to the normal operation.

SUMMARY OF THE INVENTION

In order to overcome the problems described above, preferred embodiments of the present invention provide a fuel cell system that is capable of shifting smoothly from heat-up operation to normal operation in a simple process, and a control method therefor.

According to a preferred embodiment of the present invention, a fuel cell system includes a fuel cell; an aqueous solution holding device including a first storing portion and a second storing portion each arranged to hold aqueous fuel solution to be supplied to the fuel cell, and a connecting portion arranged to connect the first storing portion and the second storing portion with each other; a circulation device including a first channel arranged to circulate a supply of the aqueous fuel solution held in the first storing portion, and a second channel arranged to circulate a supply of the aqueous fuel solution held in the first storing portion and in the second storing portion, so as to circulate the supply of the aqueous fuel solution between the fuel cell and the aqueous solution holding device; a temperature detection device arranged to detect a temperature of the aqueous fuel solution; and a setting device arranged to set an amount of the aqueous fuel solution to flow through the first channel and an amount of the aqueous fuel solution to flow through the second channel based on a detection result from the temperature detection device.

According to another preferred embodiment of the present invention, there is provided a control method for a fuel cell system. The fuel cell system includes a fuel cell and an aqueous solution holding device having a first storing portion and a second storing portion each arranged to hold aqueous fuel solution to be supplied to the fuel cell, and a connecting portion arranged to connect the first storing portion and the second storing portion with each other. The fuel cell system circulates the supply of the aqueous fuel solution between the fuel cell and the aqueous solution holding device. The control method includes steps of detecting a temperature of the aqueous fuel solution and making an amount of the circulating supply of the aqueous fuel solution from the second storing portion greater when the detected temperature of the aqueous fuel solution is not lower than a predetermined value, than when the temperature of the aqueous fuel solution is lower than the predetermined value.

According to another preferred embodiment of the present invention, an amount of aqueous fuel solution to flow in the first channel arranged to circulate the supply of aqueous fuel solution stored in the first storing portion and an amount of aqueous fuel solution to flow in the second channel arranged to circulate the supply of aqueous fuel solution stored in the first storing portion and the second storing portion are set based on a result of the temperature detection. For example, during a heat-up operation when the temperature of the aqueous fuel solution is lower than a predetermined value, the amount of aqueous fuel solution to flow in the first channel is increased, whereby thermal capacity of the aqueous fuel solution in circulation is decreased in order to raise the temperature quickly. On the other hand, when the temperature of the aqueous fuel solution becomes not lower than the predetermined value, the amount of aqueous fuel solution to flow in the second channel is increased, whereby thermal capacity of the aqueous fuel solution in circulation is increased in order to stabilize the temperature of the aqueous fuel solution. The arrangement simplifies an operation process because there is no need to return aqueous fuel solution into the circulation device from the outside. Also, the aqueous fuel solution at least from the first storing portion is circulated regardless of whether the detected temperature is or is not lower than the predetermined value, so changing the thermal capacity of aqueous fuel solution does not cause drastic changes in the state (temperature and concentration, for example) of the aqueous fuel solution supplied to the fuel cell, and therefore, it is possible to make a smooth transition from heat-up operation to normal operation.

Preferably, the first channel includes a supply channel arranged to supply the aqueous fuel solution from the first storing portion to the fuel cell; and a first return channel arranged to return the aqueous fuel solution from the fuel cell to the first storing portion. The second channel includes the supply channel; and a second return channel arranged to return the aqueous fuel solution from the fuel cell to the second storing portion. The setting device sets an amount of the aqueous fuel solution to flow through the first return channel and an amount of the aqueous fuel solution to flow through the second return channel based on a detection result from the temperature detection device. In this case, it is possible to easily change the thermal capacity of the aqueous fuel solution in circulation by simply adjusting the amount of the aqueous fuel solution flowing in the first return channel and the amount flowing in the second return channel based on a detection result from the temperature detection device. Also, regardless of the detected temperature, i.e., whether it is or is not lower than the predetermined value, the fuel cell is supplied with the aqueous fuel solution from the first storing portion, and therefore it is possible to reduce the amount of change in the temperature and concentration of aqueous fuel solution which is supplied to the fuel cell right after the thermal capacity is changed (even if the amount of aqueous solution flowing in the second return channel is increased rapidly).

Further, the first channel preferably includes a first supply channel arranged to supply the aqueous fuel solution from the first storing portion to the fuel cell; and a return channel arranged to return the aqueous fuel solution from the fuel cell to the first storing portion. The second channel preferably includes a second supply channel arranged to supply the aqueous fuel solution from the second storing portion to the fuel cell and the return channel. The setting device sets an amount of the aqueous fuel solution to flow through the first supply channel and an amount of the aqueous fuel solution to flow through the second supply channel based on a detection result from the temperature detection device. In this case, it is possible to easily change the thermal capacity of the aqueous fuel solution in circulation by simply adjusting the amount of the aqueous fuel solution flowing in the first supply channel and the amount flowing in the second supply channel based on a detection result from the temperature detection device. Also, regardless of the detected temperature, i.e., whether it is or is not lower than the predetermined value, aqueous fuel solution supplied to the fuel cell includes aqueous fuel solution from the first storing portion, and therefore it is possible to reduce the amount of change in the temperature and concentration of the aqueous fuel solution which is supplied to the fuel cell right after the thermal capacity is changed (even if the amount of aqueous solution flowing in the second supply channel is increased rapidly).

Preferably, the circulation device further includes a valve, and the setting device sets an amount of the aqueous fuel solution to flow through the first channel and an amount of the aqueous fuel solution to flow through the second channel by controlling the valve based on a detection result from the temperature detection device. In this case, there is no need to return aqueous fuel solution into the circulation device from the outside, and it is possible to easily set the amount of aqueous fuel solution flowing in the first return channel and the amount flowing in the second return channel by simply controlling the valve.

Preferably, the setting device selects one of the first channel and the second channel by controlling the valve based on a detection result from the temperature detection device. In this case, it is possible to easily change the thermal capacity by simply selecting one of the first channel and the second channel in order to circulate the aqueous fuel solution based on a result of detection from the temperature detection device. When the detected temperature is lower than a predetermined value, circulating the supply is performed by using aqueous fuel solution from the first storing portion whereas a circulating supply is performed by using aqueous fuel solution from the first storing portion and the second storing portion when the detected temperature becomes not lower than the predetermined value.

Further, a cooling device is preferably disposed in the second return channel in order to cool the aqueous fuel solution. In this case, it becomes possible to further stabilize the temperature of the aqueous fuel solution supplied to the fuel cell in normal operation by cooling the aqueous methanol solution which flows through the second return channel.

Preferably, the connecting portion includes a first connecting portion arranged to provide communication between a liquid layer in the first storing portion and a liquid layer in the second storing portion. In this case, since the liquid layer in the first storing portion and the liquid layer in the second storing portion communicate with each other, aqueous fuel solution diffuses between the first storing portion and the second storing portion so as to decrease differences in the concentration and temperature between aqueous fuel solution in the first storing portion and aqueous fuel solution in the second storing portion. Therefore, it is possible to further reduce the amount of change in the temperature and concentration of the aqueous fuel solution which is supplied to the fuel cell right after switching the thermal capacity (even if the amount of aqueous solution flowing through the second channel is increased rapidly).

Further, the connecting portion preferably further includes a second connecting portion arranged to provide communication between a gas layer in the first storing portion and a gas layer in the second storing portion. By further providing communication between the two gas layers in the first storing portion and the second storing portion, it becomes possible to promote diffusion of the aqueous fuel solution between the two storing portions, which makes it possible to further achieve uniform temperature and concentration of the aqueous fuel solution between the first storing portion and the second storing portion.

According to another preferred embodiment of the present invention, a fuel cell system includes a fuel cell; an aqueous solution holding device including a first storing portion and a second storing portion each arranged to hold aqueous fuel solution to be supplied to the fuel cell, and a connecting portion arranged to connect the first storing portion and the second storing portion with each other; a circulation device arranged to provide a circulating supply of the aqueous fuel solution between the fuel cell and the aqueous solution holding device; a temperature detection device arranged to detect a temperature of the aqueous fuel solution; and a setting device arranged to set the circulation device to one of a first mode of circulating a supply of the aqueous fuel solution held in the first storing portion and a second mode of circulating a supply of the aqueous fuel solution held in the first storing portion and in the second storing portion, based on a detection result from the temperature detection device.

According to another preferred embodiment of the present invention, setting one of the first mode in which circulating a supply is performed by using aqueous fuel solution held in the first storing portion, and a second mode in which circulating a supply is performed by using aqueous fuel solution held in the first storing portion and in the second storing portion based on a result of the temperature detection. Specifically, the temperature is raised quickly in the first mode during heat-up operation when the temperature of the aqueous fuel solution is lower than a predetermined value, taking an advantage of a small thermal capacity of the aqueous methanol solution which is in circulation. On the other hand, when the temperature of the aqueous fuel solution becomes not lower than the predetermined value, switching is made to the second mode, i.e., normal operation (steady operation), where the thermal capacity of the circulating aqueous methanol solution is greater than in the first mode, and the temperature of the aqueous methanol solution is stabilized. The arrangement simplifies an operation process because it only requires switching the modes, without the need for returning aqueous methanol solution into the circulation device from the outside. Also, the aqueous fuel solution at least from the first storing portion is circulated in whichever of the first mode and the second mode, so switching of the modes causes no drastic change in the state (temperature and concentration, for example) of aqueous fuel solution supplied to the fuel cell, and therefore it is possible to make a smooth transition from heat-up operation to normal operation.

Preferred embodiments of the present invention are particularly applicable to suitable transportation equipment.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 7 is a diagram showing a variation of the aqueous solution holding device.

FIG. 9 is a system diagram showing another preferred embodiment of the present invention.

DETAILED DESCRIPTION OF PREFERRED EMBODIMENTS

Hereinafter, preferred embodiments of the present invention will be described with reference to the drawings. The preferred embodiments are cases in which a fuel cell system 100 is provided in a motorbike 10, as an example of the transportation equipment. However, the fuel cell system 100 may be provided in any other suitable equipment.

First, a description will be made of the motorbike 10. It is noted that the terms left and right, front and rear, up and down as used in the preferred embodiments of the present invention are determined from the normal state of riding, i.e., as viewed by the driver sitting on the driver's seat of the motorbike 10, with the driver facing toward a handle 24.

Figure 1:
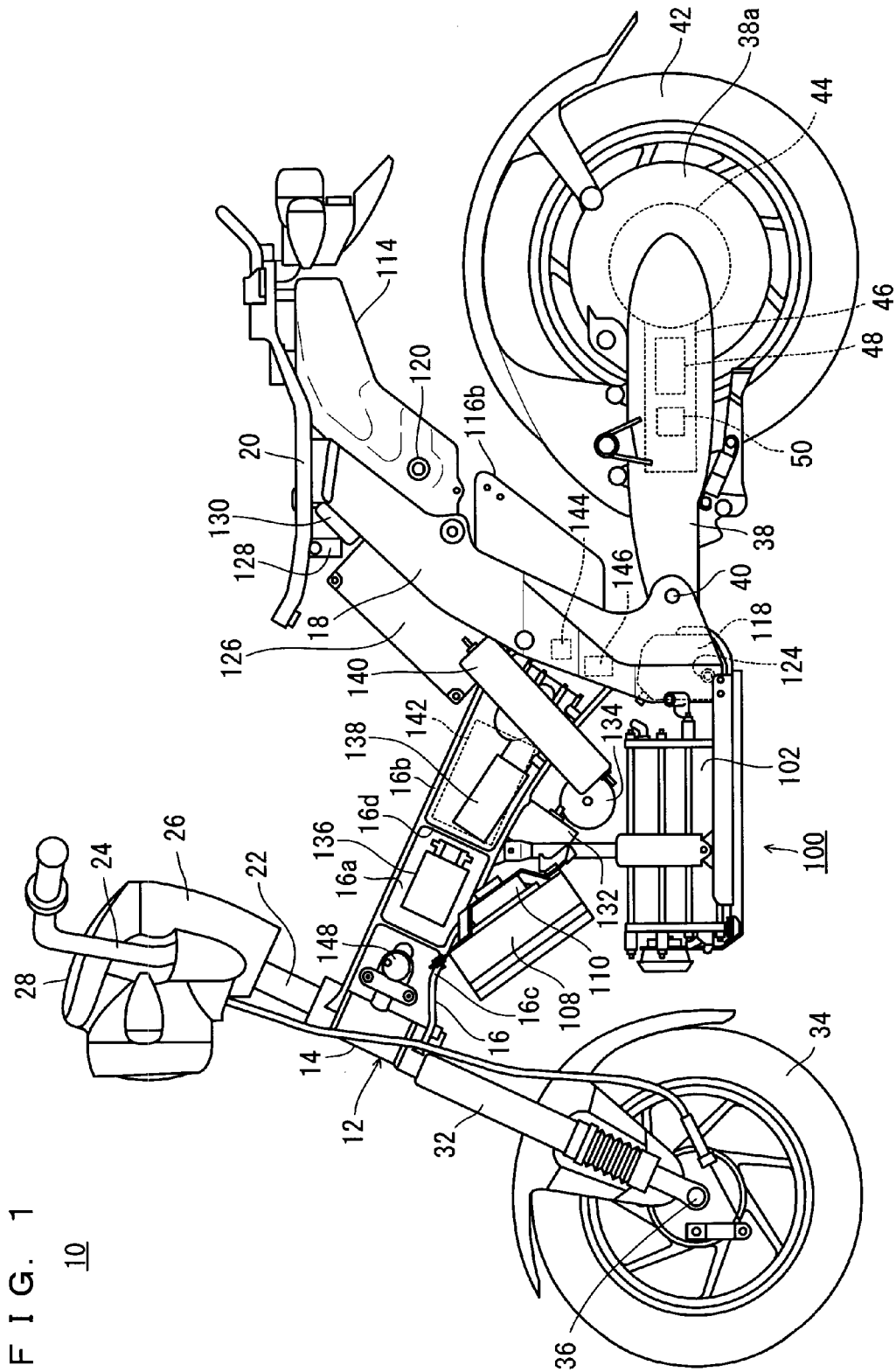
FIG. 1 is a left side view of a motorbike according to a preferred embodiment of the present invention.

Referring to FIG. 1, the motorbike 10 includes a vehicle frame 12. The vehicle frame 12 has a head pipe 14, a front frame 16 which has an I-shaped vertical section and extends in a rearward and downward direction from the head pipe 14, a rear frame 18 which is connected with a rear end of the front frame 16 and rising in a rearward and upward direction, and a seat rail 20 which is attached to a top end of the rear frame 18.

The front frame 16 preferably includes a plate member 16a which has a width in the vertical direction and extends in a rearward and downward direction, substantially perpendicularly to the lateral directions of the vehicle; flanges 16b, 16c which are arranged respectively at an upper end edge and a lower end edge of the plate member 16a, and extend in a rearward and downward direction and have a width in the lateral directions; and reinforcing ribs 16d protruding from both surfaces of the plate member 16a. The reinforcing ribs 16d and the flanges 16b, 16c define storage walls, providing compartments on both surfaces of the plate member 16a defining storage spaces for components of the fuel cell system 100 to be described later.

The rear frame 18 preferably includes a pair of left and right plate members each having a width in the front and rear directions, extending in a rearward and upward direction, and sandwiching a rear end of the front frame 16. Note that FIG. 1 shows the left plate member of the rear frame 18.

A steering shaft 22 is pivotably inserted in the head pipe 14 for steering the vehicle. A handle support 26 is provided at an upper end of the steering shaft 22, to which the handle 24 is fixed. The handle support 26 has an upper end provided with a display/operation board 28.

Figure 3:
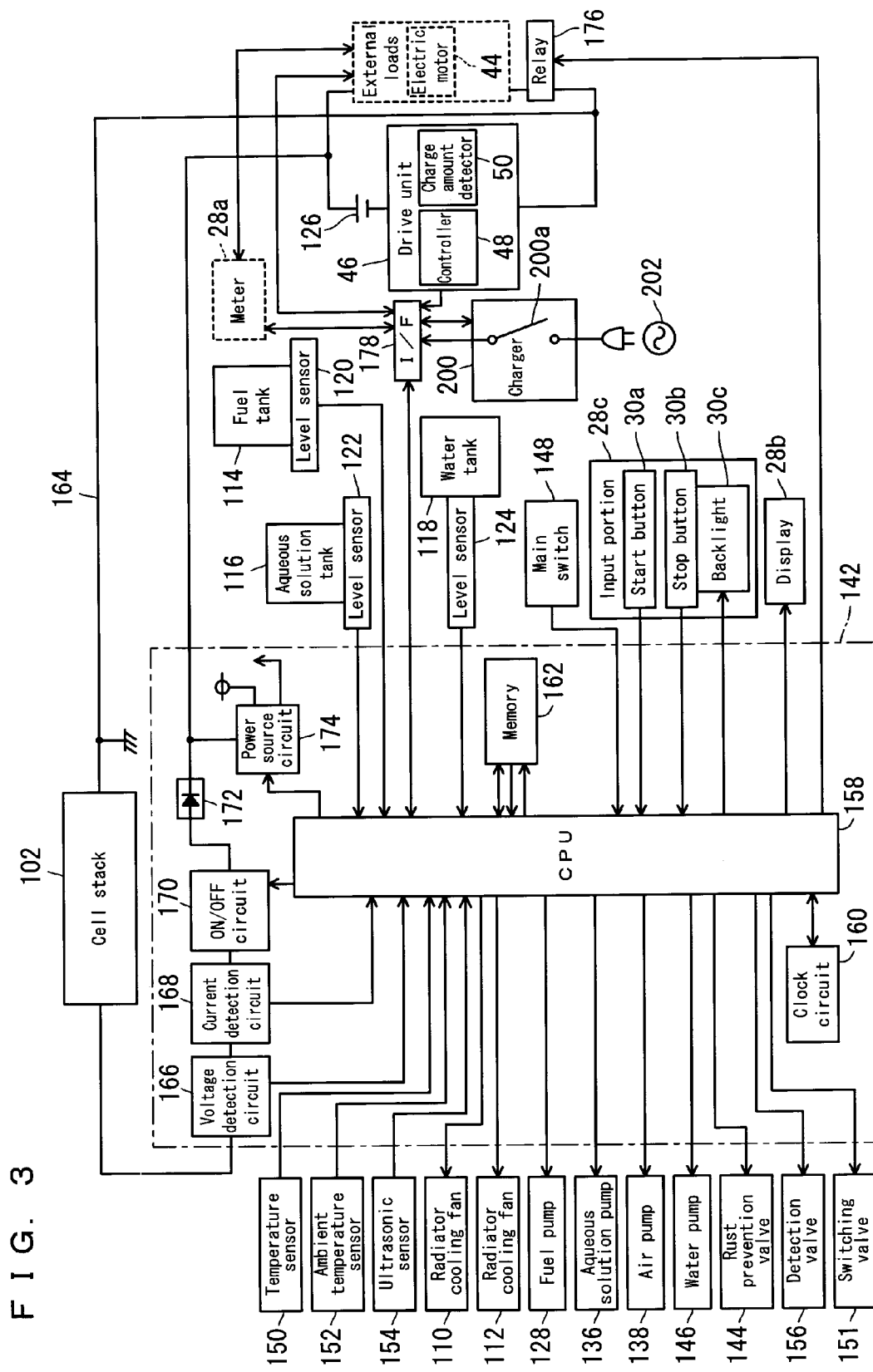
FIG. 3 is a block diagram showing an electrical configuration of the fuel cell system.

Referring also to FIG. 3, the display/operation board 28 is preferably an integrated dashboard including a meter 28a arranged to measure and display various data concerning an electric motor 44 (to be described later) for driving the motorbike 10; a display 28b provided by, e.g., a liquid crystal display, for providing the driver with a variety of information concerning the riding conditions; and an input portion 28c for inputting a variety of commands and data. The input portion 28c is preferably provided with a start button 30a for switching a relay 176 thereby connecting a fuel cell stack (hereinafter simply called cell stack) 102 and a secondary battery 126 (to be described later) with external loads such as the electric motor 44; a stop button 30b for issuing a command to stop power generation in the cell stack 102 after an operation stop command is issued; and a backlight 30c for illuminating the stop button 30b.

As shown in FIG. 1, a pair of left and right front forks 32 extend from a bottom end of the steering shaft 22. Each of the front forks 32 includes a bottom end supporting a front wheel 34 via a front wheel shaft 36. The front wheel 34 is suspended by the front forks 32, and is rotatable around the front wheel shaft 36.

On the other hand, the frame-like seat rail 20 which extends in the front and rear directions is fixed by, e.g., welding to an upper end of the rear frame 18. An unillustrated seat is pivotably provided on the seat rail 20.

The rear frame 18 includes a lower end which pivotably supports a swing arm (rear arm) 38 via a pivot shaft 40. The swing arm 38 has a rear end 38a incorporating the electric motor 44 of an axial gap type, for example, which is connected with the rear wheel 42 to rotate the rear wheel 42. The swing arm 38 also incorporates a drive unit 46 which is electrically connected with the electric motor 44. The drive unit 46 includes a controller 48 arranged to control the rotating drive of the electric motor 44, and a charge amount detector 50 arranged to detect the amount of charge in the secondary battery 126. The swing arm 38 and a rear wheel 42 are suspended with an unillustrated rear cushion/shock absorber with respect to the rear frame 18.

The motorbike 10 is equipped with the fuel cell system 100, with its constituent members being disposed along the vehicle frame 12. The fuel cell system 100 generates electric energy for driving the electric motor 44 and other system components.

Hereinafter, the fuel cell system 100 will be described with reference to FIG. 1 and FIG. 2.

The fuel cell system 100 preferably is a direct methanol fuel cell system which uses methanol (an aqueous solution of methanol) directly without reformation, for generation of electric energy (power generation).

The fuel cell system 100 includes the cell stack 102. As shown in FIG. 1, the cell stack 102 is suspended from the flange 16c, and is disposed below the front frame 16.

Figure 2:
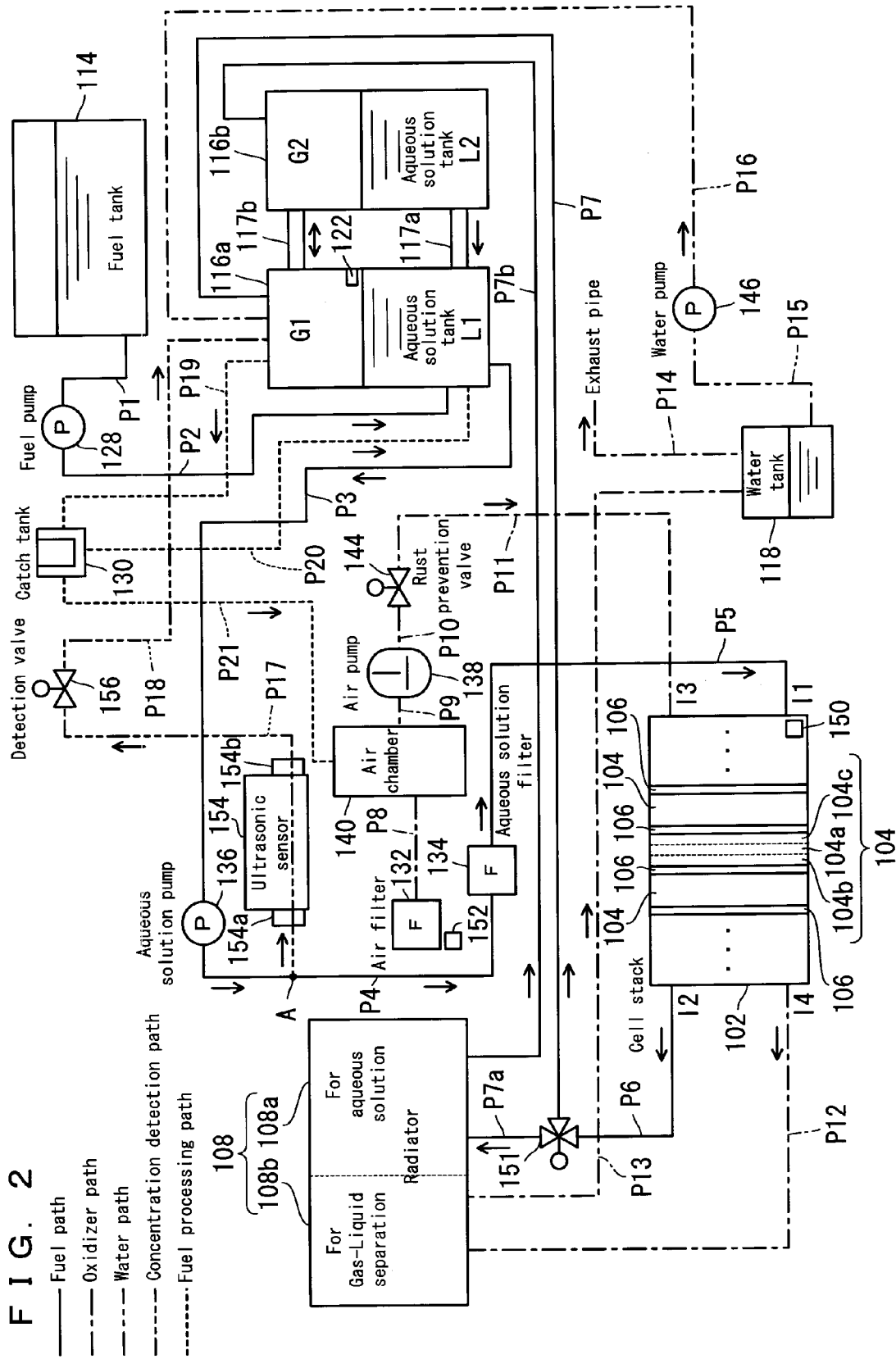
FIG. 2 is a system diagram showing piping in a fuel cell system.

As shown in FIG. 2, the cell stack 102 preferably includes a plurality of fuel cells (individual fuel cells) 104 layered (stacked) alternated with separators 106. Each fuel cell 104 is capable of generating electric power through electrochemical reactions between hydrogen ions based on methanol and oxygen. Each fuel cell 104 in the cell stack 102 includes an electrolyte film 104a preferably defined by a solid polymer film, for example, and a pair of an anode (fuel electrode) 104b and a cathode (air electrode) 104c opposed to each other, with the electrolyte film 104a in between. The anode 104b and the cathode 104c each include a platinum catalyst layer provided on the side closer to the electrolyte film 104a.

As shown in FIG. 1, a radiator unit 108 is disposed below the front frame 16 and above the cell stack 102. The radiator unit 108 has a front surface facing in a downward direction so it can receive sufficient air and wind while the vehicle is in motion.

As shown in FIG. 2, the radiator unit 108 preferably includes integrally therein, a radiator 108a for the aqueous solution and a radiator 108b for gas-liquid separation. On a back side of the radiator unit 108, there is a fan 110 provided to cool the radiator 108a, and there is another fan 112 (see FIG. 3) provided to cool the radiator 108b. In FIG. 1, the radiators 108a and 108b are disposed side-by-side, with one on the left-hand side and the other on the right-hand side, and the figure shows the fan 110 for cooling the left-hand side radiator 108a.

A fuel tank 114, aqueous solution tanks 116a, 116b, and a water tank 118 are disposed in this order from top to down, between the pair of plate members in the rear frame 18.

The fuel tank 114 is below the seat rail 20 and is attached to a rear end of the seat rail 20. The fuel tank 114 contains a methanol fuel (high concentration aqueous solution of methanol) having a high concentration level (containing methanol at approximately 50 wt %, for example) which is used as fuel for the electrochemical reaction in the cell stack 102. The fuel tank 114 is provided with a level sensor 120 arranged to detect a height of the liquid surface, i.e., an amount of liquid of the methanol fuel in the fuel tank 114.

The aqueous solution tanks 116a, 116b are disposed side-by-side, with one on the left-hand side and the other on the right-hand side, below the fuel tank 114, and attached to the rear frame 18. The aqueous solution tank 116a stores aqueous methanol solution, which is a solution of the methanol fuel from the fuel tank 114 diluted to a concentration (e.g., containing methanol at approximately 3 wt %) which is suitable for the electrochemical reactions in the cell stack 102. The aqueous solution tank 116a is provided with a level sensor 122 for detecting a height of the liquid surface, i.e., an amount of liquid of the aqueous methanol solution in the aqueous solution tank 116a. The aqueous solution tank 116b also stores aqueous methanol solution of the same concentration. The aqueous solution tanks 116a, 116b have liquid layers L1 and L2 respectively, which communicate with each other through a first connecting portion 117a. Likewise, the aqueous solution tanks 116a, 116b have gas layers G1 and G2 respectively, which communicate with each other through a second connecting portion 117b.

The water tank 118, disposed behind the cell stack 102, is mounted on the rear frame 18. A level sensor 124 is attached to the water tank 118 in order to detect a height of the water surface, i.e., an amount of the water in the water tank 118.

In front of the fuel tank 114 and above the flange 16b of the front frame 16 is the secondary battery 126. The secondary battery 126 stores the electric power from the cell stack 102, and supplies the electric power to the electric components in response to commands from a controller 142 (to be described later).

Above the secondary battery 126 and below the seat rail 20, a fuel pump 128 is disposed. Further, a catch tank 130 is disposed in front of the fuel tank 114, i.e., above and behind the secondary battery 126.

An air filter 132 is disposed in a space surrounded by the front frame 16, the cell stack 102, and the radiator unit 108 for removing impurities such as dust contained in the air. Behind and below the air filter 132, an aqueous solution filter 134 is disposed.

An aqueous solution pump 136 and an air pump 138 are housed in the storage space on the left side of the front frame 16. On the left side of the air pump 138 is an air chamber 140.

The controller 142, a rust prevention valve 144, and a water pump 146 are preferably disposed in the storage space on the right side of the front frame 16.

A main switch 148 is provided in the front frame 16, extending through the storage space in the front frame 16 from right to left. Turning on the main switch 148 supplies an operation start command to the controller 142 and turning off the main switch 148 supplies an operation stop command to the controller 142.

As shown in FIG. 2, the fuel tank 114 and the fuel pump 128 are connected with each other by a pipe P1. The fuel pump 128 and the aqueous solution tank 116a are connected with each other by a pipe P2. The aqueous solution tank 116a and the aqueous solution pump 136 are connected with each other by a pipe P3. The aqueous solution pump 136 and the aqueous solution filter 134 are connected with each other by a pipe P4. The aqueous solution filter 134 and the cell stack 102 are connected with each other by a pipe P5. The pipe P5 is connected with an anode inlet I1 of the cell stack 102. By driving the aqueous solution pump 136, aqueous methanol solution is supplied to the cell stack 102. A temperature sensor 150 is provided near the anode inlet I1 of the cell stack 102 in order to detect the temperature of the aqueous methanol solution. By detecting the temperature of the aqueous methanol solution which flows through the cell stack 102 with the temperature sensor 150, the temperature of the cell stack 102 can be detected.

The cell stack 102 and the aqueous solution tank 116a are connected with each other via a pipe P6, a switching valve 151, and a pipe P7. The cell stack 102 and the aqueous solution tank 116b are connected with each other via the pipe P6, the switching valve 151, a pipe P7a, the aqueous solution radiator 108a, and the pipe P7b. The switching valve 151 determines which of the aqueous solution tanks 116a, 116b communicate with the cell stack 102. The pipe P6 is connected with the anode outlet 12 in the cell stack 102.

The pipes P1 through P7, P7a, and P7b serve primarily as a flow path for fuel.

The air filter 132 and the air chamber 140 are connected with each other by a pipe P8. The air chamber 140 and the air pump 138 are connected with each other by a pipe P9, the air pump 138 and the rust prevention valve 144 are connected with each other by a pipe P10 whereas the rust prevention valve 144 and the fuel cell stack 102 are connected with each other by a pipe P11. The pipe P11 is connected with a cathode inlet 13 of the cell stack 102. When the fuel cell system 100 generates power, the rust prevention valve 144 is opened. By driving the air pump 138 under this condition, air containing oxygen is introduced from the outside. The rust prevention valve 144 is closed when the fuel cell system 100 is stopped, prevents backflow of water vapor into the air pump 138, and thereby prevents rusting of the air pump 138. An ambient temperature sensor 152 is provided near the air filter 132 for detection of an ambient temperature.

The cell stack 102 and the gas-liquid separation radiator 108b are connected with each other by a pipe P12. The radiator 108b and the water tank 118 are connected with each other by a pipe P13. The water tank 118 is provided with a pipe (an exhaust pipe) P14.

The pipes P8 through P14 serve primarily as a flow path for oxidizer.

The water tank 118 and the water pump 146 are connected with each other by a pipe P15 whereas the water pump 146 and the aqueous solution tank 116a are connected with each other by a pipe P16.

The pipes P15 and P16 serve as a flow path for water.

Also, a pipe P17 is connected to a branching section A of the pipe P4 so that a portion of the aqueous methanol solution which flows through the pipe P4 will flow in. An ultrasonic sensor 154 is attached to the pipe P17. The ultrasonic sensor 154 is used to detect the methanol concentration in the aqueous methanol solution (a ratio of methanol in the aqueous methanol solution), based on the principle that a travel time (propagation speed) of ultrasonic waves changes depending on the methanol concentration. The ultrasonic sensor 154 includes a transmitter unit 154a and a receiver unit 154b. An ultrasonic wave transmitted from the transmitter unit 154a is received by the receiver unit 154b to detect an ultrasonic wave travel time in the pipe P17, and a voltage value which corresponds to the travel time is taken as physical concentration information. The controller 142 detects the methanol concentration of the aqueous methanol solution in the pipe P17 based on the concentration information.

A detection valve 156 is connected with the pipe P17. The detection valve 156 and the aqueous solution tank 116a are connected with each other by a pipe P18. When detecting the methanol concentration, the detection valve 156 is closed to stop the flow of aqueous methanol solution in the pipe P17. After the detection of the methanol concentration, the detection valve 156 is opened to release the aqueous methanol solution, whose concentration has been detected, back to the aqueous solution tank 116a.

The pipes P17 and P18 serve as a flow path primarily for concentration detection.

The aqueous solution tank 116a and the catch tank 130 are connected with each other by pipes P19 and P20. The catch tank 130 and the air chamber 140 are connected with each other by a pipe P21.

The pipes P19 through P21 constitute a flow path primarily for fuel processing.

Next, reference will be made to FIG. 3 to describe an electrical configuration of the fuel cell system 100.

The controller 142 of the fuel cell system 100 preferably includes a CPU 158 for performing necessary calculations and controlling operations of the fuel cell system 100; a clock circuit 160 which provides the CPU 158 with clock signals; a memory 162 including, e.g., an EEPROM for storing programs and data for controlling the operations of the fuel cell system 100 as well as calculation data, etc; a voltage detection circuit 166 for detecting a voltage in an electric circuit 164 for connecting the cell stack 102 with external loads; a current detection circuit 168 for detecting an electric current which passes through the fuel cells 104, i.e., the cell stack 102; an ON/OFF circuit 170 for opening and closing the electric circuit 164; a diode 172 placed in the electric circuit 164; and a power source circuit 174 for providing the electric circuit 164 with a predetermined voltage.

The CPU 158 of the controller 142 as described above is supplied with detection signals from the level sensors 120, 122 and 124, as well as detection signals from the temperature sensor 150, the ambient temperature sensor 152, and the ultrasonic sensor 154. The CPU 158 is also supplied with input signals from the main switch 148 for turning ON or OFF the electric power, and input signals from the start button 30a and the stop button 30b in the input portion 28c. Further, the CPU 158 is supplied with detection signals from a charge amount detector 50. The CPU 158 calculates a charge rate of the secondary battery 126 (a ratio of the amount of charge with respect to the capacity of the secondary battery 126), using the detection signal from the charge amount detector 50 and information about the capacity of the secondary battery 126. Further, the CPU 158 is supplied with a voltage detection value from the voltage detection circuit 166 and a current detection value from the current detection circuit 168. The CPU 158 calculates an output of the cell stack 102 from the voltage detection value and the current detection value.

The CPU 158 controls system components such as the fuel pump 128, the aqueous solution pump 136, the air pump 138, the water pump 146, the fans 110, 112, the rust prevention valve 144, the switching valve 151, and the detection valve 156. The CPU 158 also controls the display 28b which displays various information for the driver of the motorbike 10. Still further, the CPU 158 controls turning ON and OFF of the backlight 30c in the input portion 28c.

The cell stack 102 is connected with the secondary battery 126 and the drive unit 46. The secondary battery 126 and the drive unit 46 are connected with external loads such as the electric motor 44, via the relay 176. The secondary battery 126 complements the output from the cell stack 102, by being charged with electric power from the cell stack 102 and discharging the electricity to supply power to the electric motor 44, the drive unit 46, and the system components, etc.

The electric motor 44 is connected with the meter 28a for measuring various data concerning the electric motor 44. The data and status information of the electric motor 44 obtained by the meter 28a are supplied to the CPU 158 via the interface circuit 178.

In addition, a charger 200 is connectable with the interface circuit 178. The charger 200 is connectable with an external power source (commercial power source) 202. When the interface circuit 178 is connected with the external power source 202 via the charger 200, an external power source connection signal is sent to the CPU 158 via the interface circuit 178. The charger 200 has a switch 200a which can be turned ON/OFF by the CPU 158.

Figure 4:
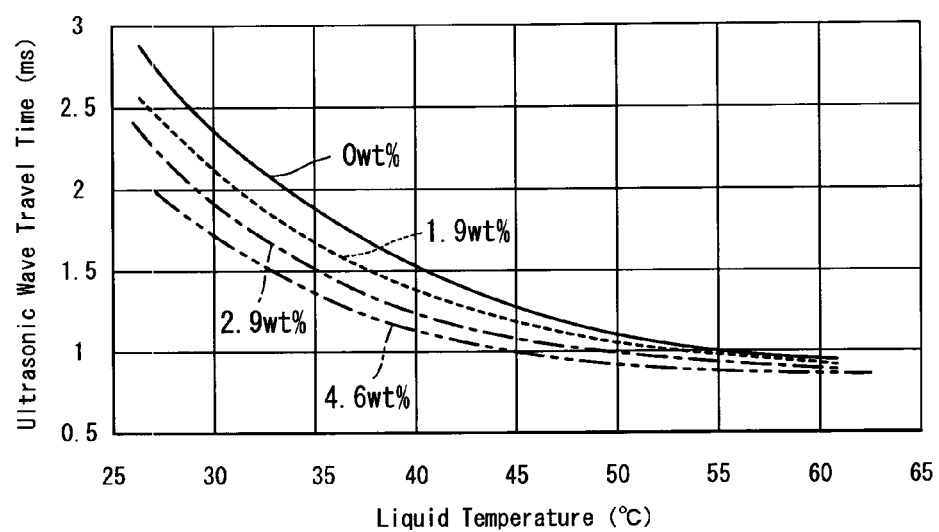
FIG. 4 is a graph showing the relationship between ultrasonic wave travel time, liquid temperature, and fuel concentration.
Figure 5:
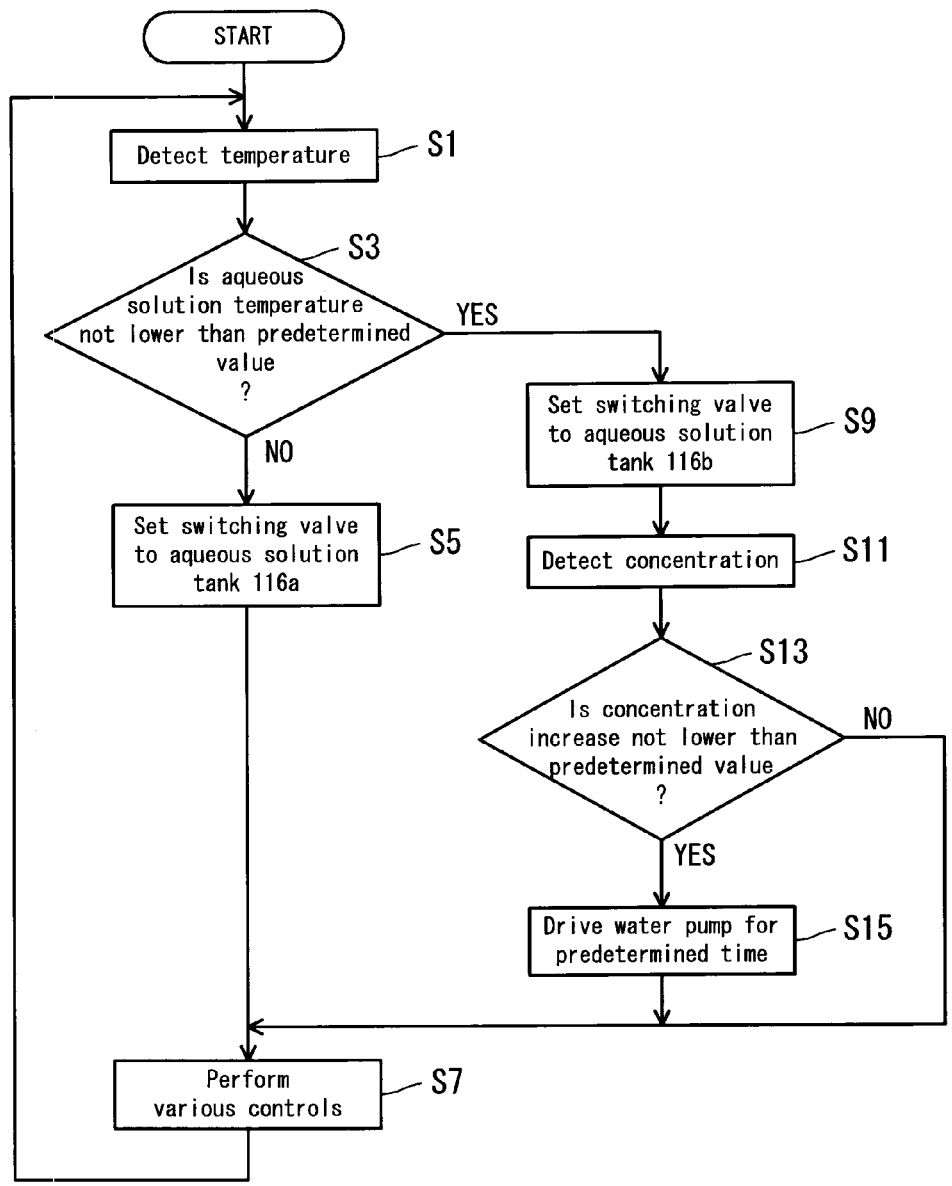
FIG. 5 is a flowchart which shows an example of an operation on according to a preferred embodiment of the present invention.

The memory 162 stores a program for performing operations shown in FIG. 5. Also, the memory 162 stores a predetermined value which serves as a threshold value of the temperature of the aqueous methanol solution, calculation data, table data which indicates the relationship between ultrasonic wave travel time (concentration information), liquid temperature, and fuel concentration as shown in FIG. 4, etc.

Although FIG. 4 shows only four relationships (curves) between the travel time and the liquid temperature at four different concentrations (about 0 wt %, about 1.9 wt %, about 2.9 wt % and about 4.6 wt %), actually, the table data which covers five or more curves are used so that a fuel concentration will be determined once a travel time and a liquid temperature are given.

Specifically, when concentration information and a liquid temperature are obtained, the CPU 158 makes reference to the table data, and detects a concentration of the aqueous methanol solution.

In the present preferred embodiment, the solution holding device preferably includes the aqueous solution tanks 116a, 116b, the first connecting portion 117a, and the second connecting portion 117b. The aqueous solution tank 116a defines the first storing portion, and the aqueous solution tank 116b defines the second storing portion. A supply channel includes the pipes P3 through P5. The first return channel includes the pipes P6 and P7. The second return channel includes the pipes P6, P7a and P7b. The circulation device includes the supply channel, the first return channel, the second return channel, and the switching valve 151. The switching valve 151 defines the valve according to the present preferred embodiment. The first channel includes the supply channel and the first return channel whereas the second channel includes the supply channel and the second return channel. The cooling device includes the aqueous solution radiator 108a and the fan 110. The temperature sensor 150 defines the temperature detection device in the present preferred embodiment. The CPU 158 defines the setting device in the present preferred embodiment.

Next, description will cover a basic process of the fuel cell system 100.

When the main switch 148 is turned ON, the fuel cell system 100 starts the controller 142 and commences its operation. Then, when the start button 30a is pressed after the controller 142 is started, the relay 176 is switched to connect external loads such as the electric motor 44 with the cell stack 102 and the secondary battery 126. When the charge rate of the secondary battery 126 becomes not higher than a predetermined value, electricity from the secondary battery 126 is used to drive the system components such as the aqueous solution pump 136 and the air pump 138, and thus power generation is started in the cell stack 102.

It should be noted here that the external loads refer to loads which consume electricity other than the electricity required for maintaining the power generation in the cell stack 102. Specifically, the external loads in the present preferred embodiment include the electric motor 44, the headlight of the motorbike 10, and so on.

Referring now to FIG. 2, aqueous methanol solution in the aqueous solution tank 116a is sent via the pipes P3, P4 to the aqueous solution filter 134 as the aqueous solution pump 136 is driven. The aqueous solution filter 134 removes impurities and so on from the aqueous methanol solution, then the aqueous methanol solution is sent through the pipe P5 and the anode inlet I1, directly to the anode 104b in each of the fuel cells 104 which constitute the cell stack 102.

Meanwhile, gas (primarily containing carbon dioxide, vaporized methanol, and water vapor) in the aqueous solution tank 116a is supplied via the pipe P19 to the catch tank 130. The methanol vapor and water vapor are cooled in the catch tank 130, and the aqueous methanol solution obtained in the catch tank 130 is returned via the pipe P20 to the aqueous solution tank 116a. On the other hand, gas (containing carbon dioxide, non-liquefied methanol, and water vapor) in the catch tank 130 is supplied via the pipe P21 to the air chamber 140.

On the other hand, as the air pump 138 is driven, air is introduced through the air filter 132 and flows through the pipe P8 into the air chamber 140 where noise is minimized. The air which was introduced into the air chamber 140 and gas from the catch tank 130 flow via the pipe P9 to the air pump 138, and then through the pipe P10, the rust prevention valve 144, the pipe P11, and the cathode inlet I3, into the cathode 104c in each of the fuel cells 104 which constitute the cell stack 102.

At the anode 104b in each fuel cell 104, methanol and water in the supplied aqueous methanol solution chemically react with each other to produce carbon dioxide and hydrogen ions. The produced hydrogen ions flow to the cathode 104c via the electrolyte film 104a, and electrochemically react with oxygen in the air supplied to the cathode 104c, to produce water (water vapor) and electric energy. Thus, power generation is performed in the cell stack 102. The electricity from the cell stack 102 is used to charge the secondary battery 126, to drive the motorbike 10 and so on. The temperature of the cell stack 102 is increased by the heat associated with the electrochemical reactions. The output of the cell stack 102 increases as the temperature rises, and the cell stack 102 becomes able to perform normal constant power generation at approximately 60° C. In the present preferred embodiment, as described later, operation of the fuel cell system 100 shifts from a heat-up operation to a normal operation when the temperature of the cell stack 102 exceeds about 60° C.

Carbon dioxide and unused aqueous methanol solution produced at the anode 104b in each fuel cell 104 are heated in the electrochemical reactions. In the heat-up operation, the carbon dioxide and unused aqueous methanol solution are returned to the aqueous solution tank 116a via the anode outlet I2 of the cell stack 102 as well as the pipes P6 and P7, whereas in the normal operation, they are returned to the aqueous solution tank 116b after flowing through the pipes P6 and P7a, cooled by the aqueous solution radiator 108a, and flowing through the pipe P7b. Cooling of carbon dioxide and unused methanol by the radiator 108a is enhanced by operation of the fan 110.

Meanwhile, most of the water vapor provided on the cathode 104c in each fuel cell 104 is liquefied and discharged in the form of water from the cathode outlet I4 of the cell stack 102, with saturated water vapor being discharged in the form of gas. A portion of the water vapor which is discharged from the cathode outlet I4 is supplied via the pipe P12 to the radiator 108b, where it is cooled and liquefied as its temperature decreases to or below the dew point. The radiator 108b liquefies the water vapor through operation of the fan 112. Discharge from the cathode outlet I4, which contains water (liquid water and water vapor), carbon dioxide, and unused air, is supplied via the pipe P12, the radiator 108b, and the pipe P13 to the water tank 118 where water is collected, and thereafter, discharged to the outside via the pipe P14.

At the cathode 104c in each fuel cell 104, the vaporized methanol from the catch tank 130 and methanol which has moved to the cathode 104c due to crossover react with oxygen in the platinum catalyst layer, thereby being decomposed to harmless substances of water and carbon dioxide.

The water and carbon dioxide produced from the methanol are discharged from the cathode outlet 14, and supplied to the water tank 118 via the radiator 108b. Further, water which has moved due to water crossover to the cathode 104c in each fuel cell 104 is discharged from the cathode outlet 14, and supplied to the water tank 118 via the radiator 108b. The water collected in the water tank 118 is recycled appropriately by pumping operation of the water pump 146, through the pipes P15, P16 to the aqueous solution tank 116a, and is used as water for the aqueous methanol solution.

Next, main operations of the fuel cell system 100 in the heat-up operation and in the normal (steady) operation will be described with reference to FIG. 5. It should be noted here that the heat-up operation is performed when the temperature of the aqueous methanol solution is lower than a predetermined value, whereas the normal operation is performed when the temperature of aqueous methanol solution becomes not lower than the predetermined value.

As power generation is started in the fuel cell system 100, the temperature sensor 150 detects the temperature of the aqueous methanol solution (Step S1), and the CPU 158 checks if the detected temperature of the aqueous methanol solution is not lower than a predetermined value (for example, approximately 60° C. in the present preferred embodiment) (Step S3). If the temperature of the aqueous methanol solution is lower than the predetermined value, it is necessary to heat the cell stack 102 further, and therefore the CPU 158 sets the switching valve 151 to select the aqueous solution tank 116a (Step S5). Specifically, the setting is made for a first mode where aqueous methanol solution from the cell stack 102 is returned to the aqueous solution tank 116a via the pipes P6 and P7, and circular supply of aqueous methanol solution from the aqueous solution tank 116a to the cell stack 102 is performed. This makes it possible to keep a small thermal capacity of aqueous methanol solution in circulation, and thereby to raise the temperature of the cell stack 102 quickly.

Then, the fuel pump 128, the aqueous solution pump 136, and the water pump 146 are controlled based on instructions from the CPU 158, whereby various controls are performed, e.g., concentration control and flow control of aqueous methanol solution, and output control of the cell stack 102 (Step S7). The process then goes back to Step S1 to continue power generation. It should be noted here that in the heat-up operation, raising the concentration of the aqueous methanol solution is effective in order to shorten the heat-up time, and so the concentration is set to about 5 wt %, for example.

If Step S3 determines that the temperature of the aqueous methanol solution is not lower than the predetermined value, the system determines that the cell stack 102 can be brought to normal operation (steady operation), and the CPU 158 sets the switching valve 151 to select the aqueous solution tank 116b (Step S9). Specifically, setting is made for a second mode where the aqueous methanol solution from the cell stack 102 is returned to the aqueous solution tank 116b via the pipes P6 and P7a, the aqueous solution radiator 108a, and the pipe P7b, and the aqueous methanol solution in both of the aqueous solution tanks 116a and 116b is circulated to the cell stack 102. This makes it possible to increase the thermal capacity of the aqueous methanol solution in circulation, and thereby to stabilize the temperature of the cell stack 102 in normal operation.

It should be noted here that there can be the following case. Specifically, during the heat-up operation, highly concentrated aqueous methanol solution from the aqueous solution tank 116a diffuses into the aqueous solution tank 116b.

Then, this highly concentrated aqueous methanol solution is returned to the aqueous solution tank 116a after the switching from the heat-up operation to the normal operation, causing a rapid increase in the concentration of the aqueous methanol solution which is being supplied from the aqueous solution tank 116a to the cell stack 102.

In order to manage this, concentration of the aqueous methanol solution is detected (Step S11) after the switching is made on the switching valve 151 in Step S9, to see if the concentration increase within a predetermined time is not lower than a predetermined value (for example, about 1 wt % in the present preferred embodiment) (Step S13). If an increase is not lower than the predetermined value, the water pump 146 is driven for a predetermined amount of time to supply water to the aqueous solution tank 116a (Step S15), in order to stabilize the concentration of the aqueous methanol solution. Since a large amount of water is required to lower the concentration of the aqueous methanol solution, it is desirable that the liquid level control in the aqueous solution tank 116a is stopped when the water pump 146 is driven in Step S15.

After Step S15, the process goes to Step S7. The process also goes to Step 7 if Step S13 determines that the temperature increase is lower than the predetermined value. In Step S7, various controls are performed, e.g. concentration control and flow control of aqueous methanol solution, output control of the cell stack 102, etc. The process then goes back to Step S1. In normal operation, it is desirable that the concentration of the aqueous methanol solution is controlled to be about 3 wt %, for example.

It should be noted here that the concentration detection in Step S11 involves detection of concentration information by the ultrasonic sensor 154, temperature detection of the aqueous methanol solution by the temperature sensor 150, and concentration detection of the aqueous methanol solution by making reference to table data as shown in FIG. 4.

In the operational example described above, the liquid level in the aqueous solution tank 116a fluctuates in heat-up operation but within a smaller range than in normal operation since the aqueous methanol solution from the cell stack 102 is returned to the aqueous solution tank 116a. Therefore, aqueous methanol solution in the aqueous solution tank 116b is not very much likely to flow into the aqueous solution tank 116a during the heat-up operation, making it possible to perform power generation using aqueous methanol solution primarily from the aqueous solution tank 116a.

On the other hand, in normal operation, aqueous methanol solution from the cell stack 102 is returned to the aqueous solution tank 116b, which decreases the liquid level in the aqueous solution tank 116a while increasing the liquid level in the aqueous solution tank 116b. Since the aqueous solution tanks 116a and 116b have their respective liquid layers L1 and L2 communicating with each other, and their respective gas layers G1 and G2 communicating with each other, aqueous methanol solution flows from the aqueous solution tank 116b to the aqueous solution tank 116a to equalize the liquid levels in the aqueous solution tanks 116a and 116b. This makes it possible to perform power generation using aqueous methanol solution from both of the aqueous solution tanks 116a and 116b.

According to the fuel cell system 100 which operates as described, the temperature is raised quickly in the first mode during heat-up operation, taking advantage of a small thermal capacity of the aqueous methanol solution which is in circulation whereas in normal operation, the temperature of the aqueous methanol solution is stabilized by switching to the second mode where thermal capacity of the circulating aqueous methanol solution is greater than in the first mode. The arrangement simplifies the operation process because it only requires switching the modes, without the need to return the aqueous methanol solution into the circulation device from the outside. Also, the aqueous methanol solution at least in the aqueous solution tank 116a is circulated in whichever of the first mode and the second mode, so by switching of the modes (even if the amount of aqueous solution flowing in the second return channel is increased rapidly) there is no drastic change in the state (temperature and concentration, for example) of the aqueous methanol solution supplied to the cell stack 102, and therefore it is possible to make a smooth transition from heat-up operation to normal operation.

Also, the modes are easily changed by simply operating the switching valve 151 based on a result of the temperature detection thereby directing the flow of aqueous methanol solution to the aqueous solution tank 116a or the aqueous solution tank 116b, making it possible to easily change the thermal capacity of the circulating aqueous methanol solution. Also, in whichever of the modes, the cell stack 102 is supplied with the aqueous methanol solution from the aqueous solution tank 116a, and therefore it is possible to reduce the amount of change in the temperature and concentration of the aqueous methanol solution supplied to the cell stack 102 right after the switching from the first mode to the second mode.

Further, by cooling the aqueous methanol solution which flows through the second return channel that leads to the aqueous solution tank 116b, it is possible to further stabilize the temperature of the aqueous methanol solution supplied to the cell stack 102 in normal operation.

Also, since the aqueous solution tanks 116a, 116b have their respective liquid layers L1 and L2 communicating with each other through the first connecting portion 117a, and their respective gas layers G1 and G2 communicating with each other through the second connecting portion 117b, aqueous methanol solution diffuses between the aqueous solution tanks 116a, 116b so as to decrease the differences in the temperature and concentration between the aqueous methanol solution in the aqueous solution tank 116a and the aqueous methanol solution in the aqueous solution tank 116b. Therefore, it is possible to further reduce the amount of change in the temperature and concentration of the aqueous methanol solution which is supplied to cell stack 102 right after the change from the first mode to the second mode.

Figure 6:
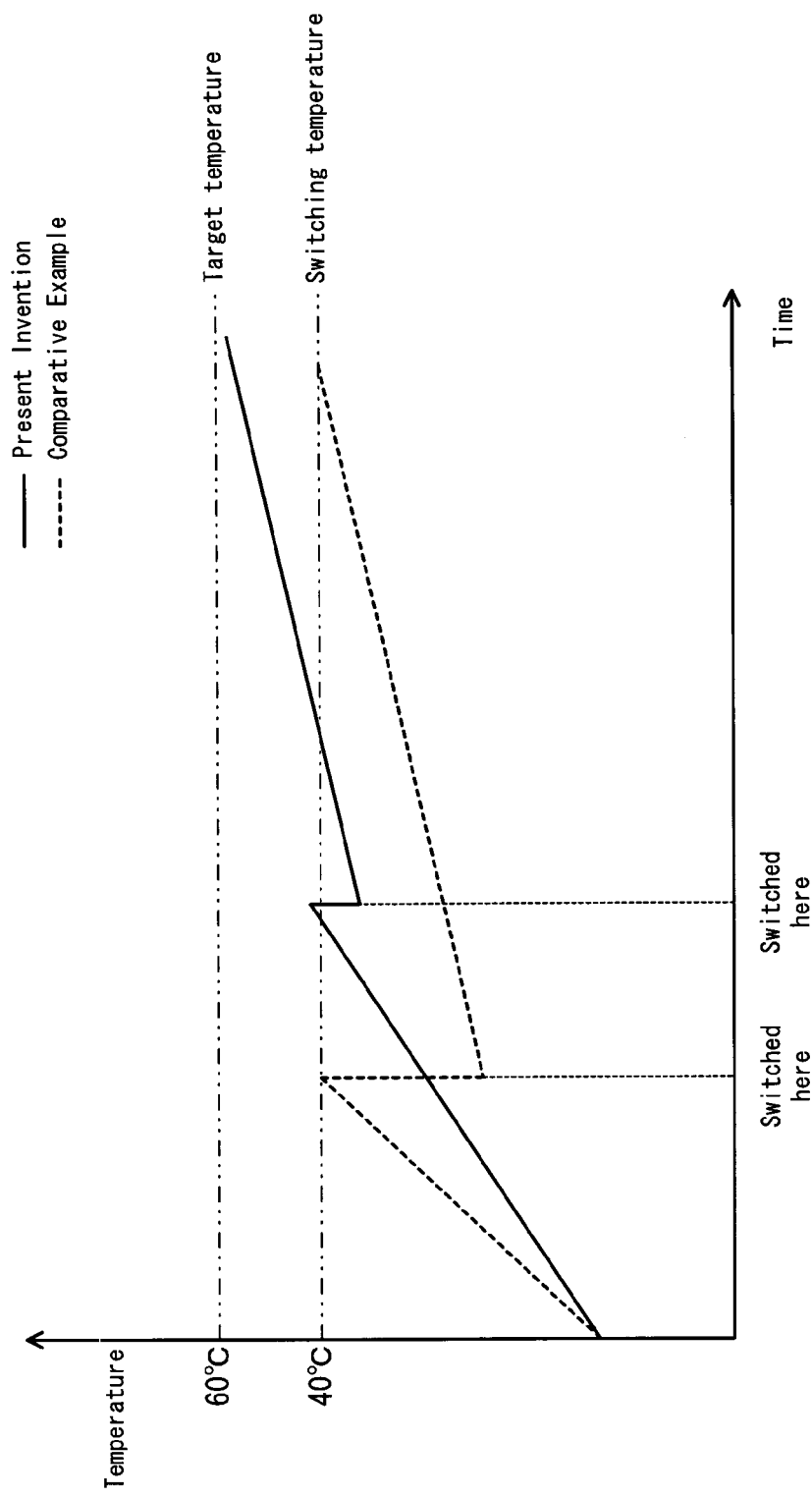
FIG. 6 is a graph which shows a result of an experiment.

FIG. 6 shows a result of an experiment performed with the fuel cell system 100 described above and with a comparative example.

In the comparative example, aqueous solution tanks in a fuel cell system are provided independently, without being connected with each other. FIG. 6 shows the temperature of the aqueous methanol solution when switching was made from a mode of using the aqueous methanol solution in the aqueous solution tank 116a to a mode of using the aqueous methanol solution in the aqueous solution tank 116b.

Referring to FIG. 6, in the fuel cell system, in which the aqueous solution tanks 116a and 116b communicate with each other, the temperature of the aqueous methanol solution held in the aqueous solution tank 116a diffuses to the aqueous methanol solution in the aqueous solution tank 116b slowly during the heat-up operation. Moreover, the cell stack 102 receives a supply of the aqueous methanol solution from the aqueous solution tank 116a regardless of the mode. Therefore, switching from the heat-up operation to normal operation does not very much decrease the temperature of the aqueous methanol solution. On the contrary, in the comparative example, the temperature of the aqueous solution in the aqueous solution tank 116b is not raised before switching, so the temperature of the aqueous solution supplied to the cell stack 102 decreases drastically at the time of switching, and therefore it takes a long time for the aqueous methanol solution in the aqueous solution tank 116b to attain the target temperature. This also explains why the fuel cell system 100 can reduce the amount of change in the state of the aqueous methanol solution.

It should be noted here that in the fuel cell system 100 described above, the positional relationship between the aqueous solution tanks 116a and 116b is not limited to side-by-side relationship in the right-and-left direction but may be one-after-the-other relationship in the front-to-rear direction.

Also, as shown in FIG. 7, the aqueous solution holding device may be defined by a single aqueous solution tank 204. In this case, a partition plate 206 is disposed at a center of the aqueous solution tank 204, with gaps 208a and 208b provided in an upper region and a lower region. In this arrangement, the left and the right sides of the partition plate 206 define a first storing portion 204a and a second storing portion 204b, respectively, the upper gap 208a defines the second connecting portion for connecting the gas layers G1 and G2, and the lower gap 208b defines the first connecting portion for connecting the liquid layers L1 and L2. Other aspects of the configuration are the same as the previous fuel cell system 100.

In this case, it is possible to make the aqueous solution holding device, and therefore the fuel cell system, smaller.

Figure 8:
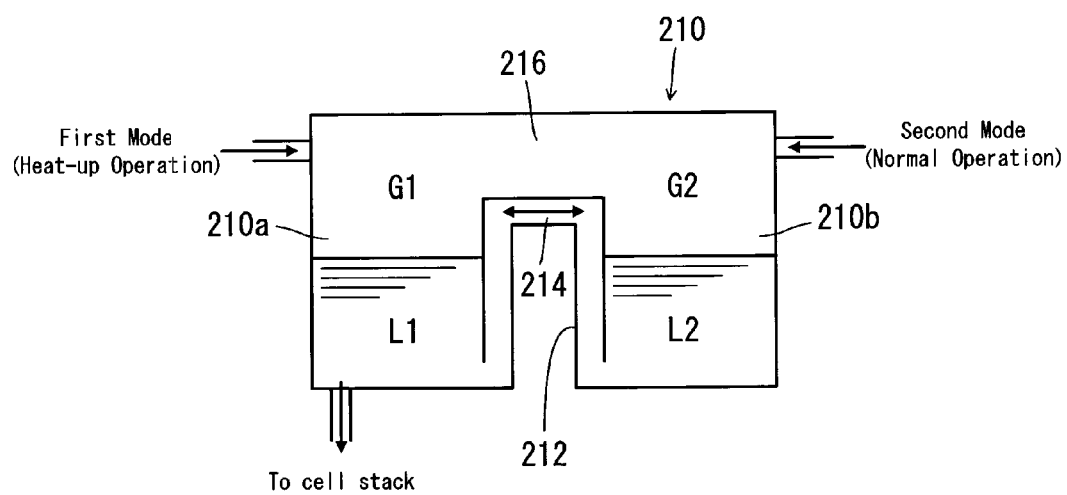
FIG. 8 is a diagram showing another variation of the aqueous solution holding device.

Further, as shown in FIG. 8, the aqueous solution holding device may be defined by a single aqueous solution tank 210. The aqueous solution tank 210 has its center portion formed with a recess 212, so that the left and the right sides of the recess 212 define a first storing portion 210a and a second storing portion 210b respectively. Then, a communication tube 214 provides communication between the liquid layers L1 and L2 along the recess 212, with an upper space 216 of the communication tube 214 in the aqueous solution tank 210 providing communication between the gas layers G1 and G2.

In this case, aqueous methanol solution moves between the first storing portion 210a and the second storing portion 210b by siphonage, to equalize the liquid level of aqueous methanol solution in the first storing portion 210a and the liquid level of aqueous methanol solution in the second storing portion 210b.

Figure 9:
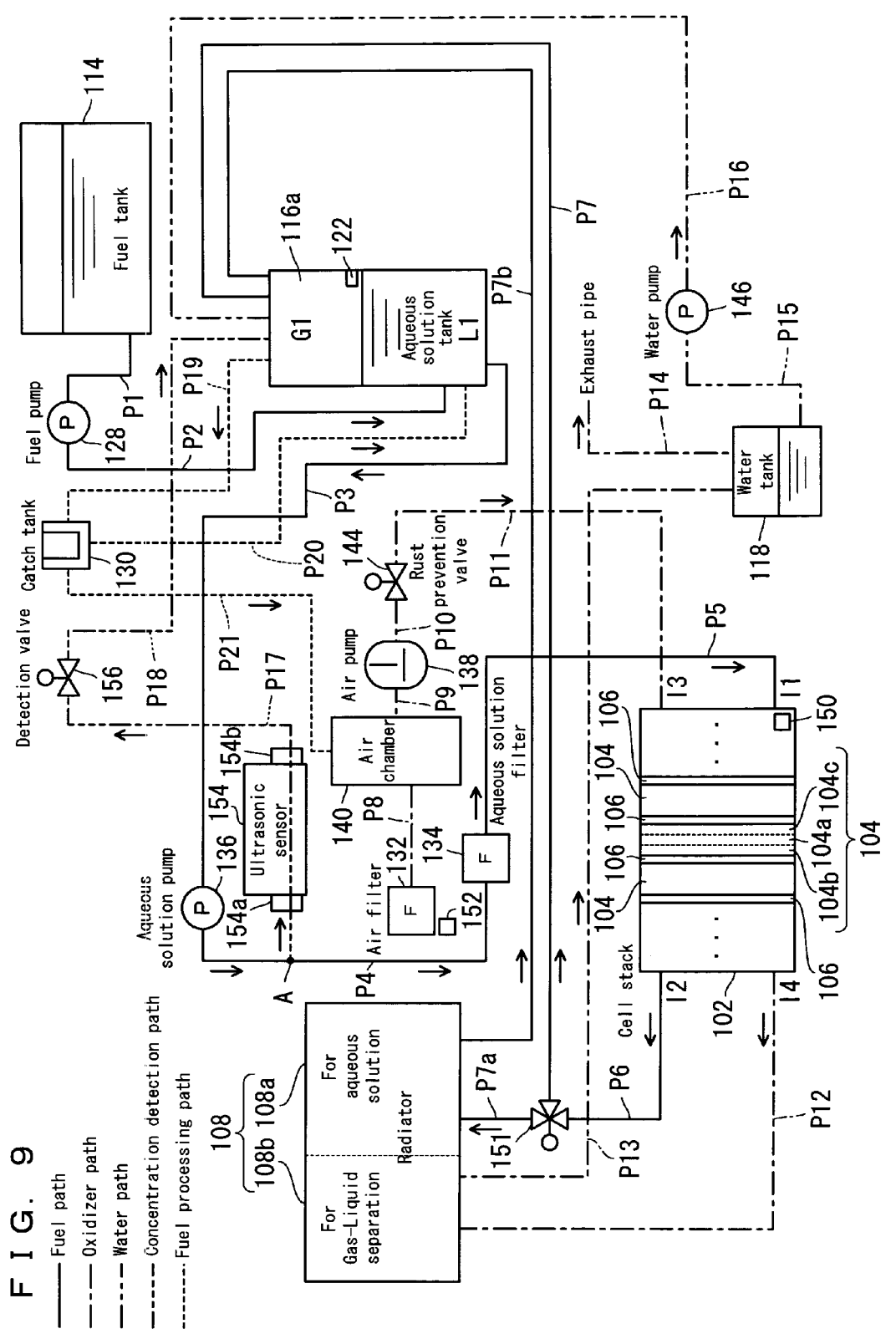

Also, as shown in FIG. 9, the aqueous solution tank 116b in the fuel cell system 100 in FIG. 2 may be removed, with the aqueous solution radiator 108a being connected with the aqueous solution tank 116a via the pipe P7b. In this case, the aqueous solution holding device includes the aqueous solution tank 116a, the aqueous solution radiator 108a, and the pipe P7b. The aqueous solution tank 116a defines the first storing portion, the aqueous solution radiator 108a defines the second storing portion, and the pipe P7b defines the connecting portion. The second return channel includes the pipes P6 and P7a. Other aspects of the configuration are the same as the previous fuel cell system 100.

In this case again, it is possible to make the fuel cell system smaller.

It should be noted here that each of the gas-liquid separating radiator 108b and the aqueous solution radiator 108a may be provided as individual components.

The first connecting portion 117a may also be provided with a valve.

Also, the switching valve 151 may also be able to control the amount of flow of the aqueous solution. In this case, the amount of aqueous methanol solution flowing in the first return channel and in the second return channel can be set easily by simply controlling the switching valve 151 based on a temperature detection result of the aqueous methanol solution.

For example, if the temperature of the aqueous methanol solution is lower than a predetermined value, the aqueous methanol solution is returned only through the first return channel, and as the temperature of aqueous methanol solution becomes not lower than the predetermined value, both of the return channels are used, with the ratio of the flows in the first return channel and the second return channel being adjusted. Also, as the temperature of the aqueous methanol solution becomes not lower than the predetermined value, aqueous methanol solution is returned only through the second return channel. In these examples, the first mode is defined as a case where the aqueous methanol solution flows only through the first return channel of the first and the second return channels, whereas the second mode is defined as a case where the aqueous methanol solution flows through both of the first and the second return channels, or only through the second return channel.

Also, the ratio of the aqueous methanol solution flowing in the second return channel to the flow in the first return channel may be gradually increased in response to the temperature increase in the aqueous methanol solution. Typically, operation begins with a first state in which the aqueous methanol solution flows only in the first return channel, then shifts to a second state where the solution flows both in the first and the second return channels, and then shift further to a third state where the solution flows only in the second return channel. In this case, it is possible to easily change the thermal capacity of circulating the aqueous methanol solution by simply adjusting the amount of the aqueous methanol solution flowing in the first return channel and the amount flowing in the second return channel based on a result of temperature detection of the aqueous methanol solution.

The arrangement in the above-described preferred embodiment preferably uses a circulation device including one supply channel and two return channels (the first return channel and the second return channel). However, the present invention is not limited to this. For example, the circulation device may include two supply channels and one return channel.

Figure 10:
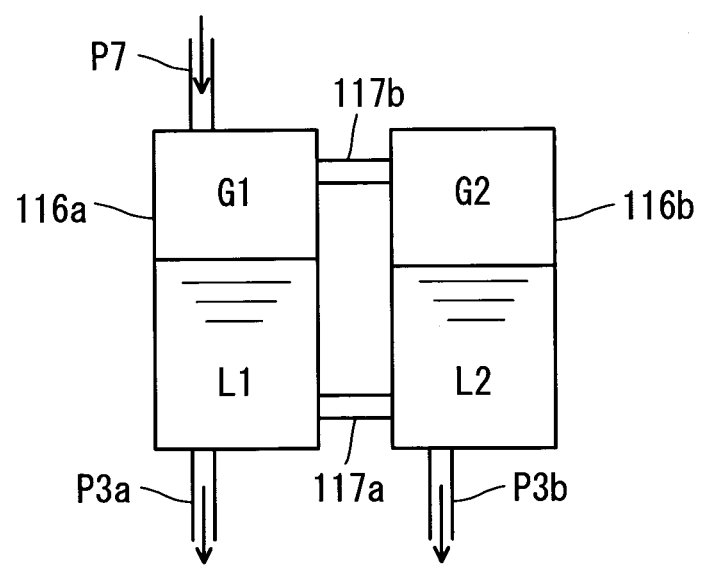
FIG. 10 is a diagram showing another example of the circulation device.

Referring to FIG. 10, there may be an arrangement that the aqueous solution tanks 116a and 116b are provided with pipes P3a and P3b, respectively, for supplying aqueous methanol solution to the cell stack 102, and aqueous methanol solution from the cell stack 102 is returned via the pipe P7 only to the aqueous solution tank 116a. In this example, the first supply channel includes the pipe P3a, the second supply channel includes the pipe P3b, and the return channel includes the pipe P7. The first channel includes the first supply channel and the return channel, and the second channel includes the second supply channel and the return channel. In this case, it is possible to easily change the thermal capacity of the circulating aqueous methanol solution by simply adjusting the amount of the aqueous methanol solution flowing in the pipe P3a and the amount flowing in the pipe P3b based on a result of temperature detection of the aqueous methanol solution. Also, regardless of the detected temperature, i.e., whether it is or is not lower than the predetermined value, aqueous methanol solution supplied to the cell stack 102 includes the aqueous methanol solution from the aqueous solution tank 116a, and therefore it is possible to reduce the amount of change in the temperature and concentration of the aqueous methanol solution which is supplied to the cell stack 102 right after the thermal capacity is changed (even if the amount of aqueous solution flowing in the pipe P3b is increased rapidly) from the first mode to the second mode.

Also, the first channel and the second channel need not have a common portion but may be formed individually from each other.

Detection of the temperature of the aqueous methanol solution need not be made by the temperature sensor 150. For example, a temperature sensor may be provided near the ultrasonic sensor 154 to detect the temperature of aqueous methanol solution in the pipe P17.

The fuel cell system of the preferred embodiments of the present invention is applicable not only to motorbikes but also to any other transportation equipment such as automobiles and marine vessels.

In the preferred embodiments described above, methanol is preferably used as fuel and aqueous methanol solution is preferably used as aqueous fuel solution. However, the present invention is not limited to this, and the fuel may be provided by other alcohol fuels such as ethanol, and the aqueous fuel solution may be provided by an aqueous solution of the alcohol, such as an aqueous ethanol solution.

Also, the present invention is applicable to stationary type systems as long as a liquid fuel is used. Further, the present invention is applicable to fuel cell systems for personal computers, portable devices, small electronic appliances, etc.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A fuel cell system comprising:
   a fuel cell including an anode;
   an aqueous solution holding device including a first storing portion and a second storing portion each arranged to hold aqueous fuel solution to be supplied to the fuel cell, and a connecting portion arranged to connect the first storing portion and the second storing portion with each other;
   a circulation device arranged to circulate a supply of the aqueous fuel solution between the fuel cell and the aqueous solution holding device by supplying the aqueous fuel solution from the aqueous solution holding device to the anode of the fuel cell and returning the aqueous fuel solution from the anode of the fuel cell to the aqueous solution holding device, the circulation device including a supply channel arranged to supply the aqueous fuel solution from the first storing portion to the anode of the fuel cell, a first return channel arranged to return the aqueous fuel solution from the anode of the fuel cell to the first storing portion, and a second return channel arranged to return the aqueous fuel solution from the anode of the fuel cell to the second storing portion without the aqueous fuel solution first passing through the first storing portion;
   a temperature detection device arranged to detect a temperature of the aqueous fuel solution; and
   a setting device programmed to set an amount of the aqueous fuel solution to flow through the first return channel and an amount of the aqueous fuel solution to flow through the second return channel based on a detection result from the temperature detection device; wherein the second storing portion is arranged to concurrently receive the aqueous fuel solution into the second storing portion through an input pipe of the second return channel and to discharge the aqueous fuel solution from the second storing portion through the connecting portion to the first storing portion.

2. The fuel cell system according to claim 1, wherein the circulation device further includes a valve, and the setting device sets the amount of the aqueous fuel solution to flow through the first return channel and the amount of the aqueous fuel solution to flow through the second return channel by controlling the valve based on the detection result from the temperature detection device.

3. The fuel cell system according to claim 2, wherein the setting device selects one of the first return channel and the second return channel by controlling the valve based on the detection result from the temperature detection device.

4. The fuel cell system according to claim 1, further comprising a cooling device disposed in the second return channel and arranged to cool the aqueous fuel solution.

5. The fuel cell system according to claim 1, wherein the connecting portion includes a first connecting portion arranged to provide communication between a liquid in the first storing portion and a liquid in the second storing portion.

6. The fuel cell system according to claim 5, wherein the connecting portion further includes a second connecting portion arranged to provide communication between a gas in the first storing portion and a gas in the second storing portion.

7. Transportation equipment comprising the fuel cell system according to claim 1.

8. The fuel cell system according to claim 1, wherein the circulation device includes a switching valve, and the setting device is programmed to set the switching valve of the circulation device to a first position in which the supply of the aqueous fuel solution flows through the first return channel to the first storing portion and to a second position in which the supply of the aqueous fuel solution flows concurrently through both of the first and the second return channels, or only through the second return channel based on the detection result from the temperature detection device.

9. The fuel cell system according to claim 8, further comprising a cooling device disposed in the circulation device, the cooling device arranged to cool the aqueous fuel solution; wherein in the first position, the supply of the aqueous fuel solution flows through the first storing portion but not through the cooling device, and in the second position, the supply of the aqueous fuel solution flows concurrently through the cooling device and both the first storing portion and the second storing portion based on the detection result from the temperature detection device.

10. The fuel cell system according to claim 1, further comprising a switching valve and a cooling device disposed in the circulation device, the cooling device arranged to cool the aqueous fuel solution, wherein, based on the detection result from the temperature detection device:

the setting device is programmed to set the switching valve of the circulation device to a first position in which the supply of the aqueous fuel solution flows from the first storing portion to the anode of the fuel cell and from the anode of the fuel cell to the first storing portion but not through the cooling device; and the setting device is programmed to set the switching valve of the circulation device to a second position in which the supply of the aqueous fuel solution flows concurrently through the cooling device and both the first storing portion and the second storing portion.

11. The fuel cell system according to claim 10, wherein in the first position, the supply of the aqueous fuel solution flows through the first return channel, and in the second position, the supply of the aqueous fuel solution flows through both of the first and the second return channels, or only through the second return channel.

* * * * *